(12) United States Patent
Hansen

(10) Patent No.: US 6,478,422 B1
(45) Date of Patent: Nov. 12, 2002

(54) SINGLE BIFOCAL CUSTOM SHOOTERS GLASSES

(75) Inventor: Richard Arvid Hansen, Meadow Vista, CA (US)

(73) Assignee: Richard A. Hansen, Meadow Vista, CA (US)

( * ) Notice: Subject to any disclaimer, the term of this patent is extended or adjusted under 35 U.S.C. 154(b) by 0 days.

(21) Appl. No.: 09/826,481

(22) Filed: Jul. 2, 2001

Related U.S. Application Data

(60) Provisional application No. 60/277,034, filed on Mar. 19, 2001.

(51) Int. Cl.[7] .................................................. G02C 7/08
(52) U.S. Cl. ........................................ 351/172; 351/168
(58) Field of Search ................................ 351/168–172, 351/177

(56) References Cited

PUBLICATIONS

Obrig, T.E.; Modern Ophthalmic Lenses and Optical Glass; The Chilton Company, Philadelphia, PA (1944); pp. 261–271.*

Elmstrom, G.P.; "What's New"; Journal of the American Optometric Association; vol. 43, No. 7; (Jul. 1972); p. 795.*

* cited by examiner

Primary Examiner—Scott J. Sugarman
(74) Attorney, Agent, or Firm—Richard A. Hansen

(57) ABSTRACT

The present invention includes a pair of glasses to be worn by a shooter using a scoped rifle or pistol where correction is needed by the shooter in order to obtain a clear site picture in the viewing end of the scope. The right lens for a right handed shooter would contain a custom bifocal element for sighting convenience. The left eye lens would not contain this bifocal area but would be clear or prescription for distance as required by the shooter. The far sighted person would want a bifocal similar to their reading glass correction in order for the image on the scope to be clear and focused since the scope is viewed from a distance called eye relief. Properly placed and sized, this bifocal area does not impede the distance viewing of the glasses and thus, the hunter or shooter does not have to put on and take off his glasses constantly while in the field. The left handed shooter would need the shooters bifocal in the left eye and not in right side. The placement of the bifocal near the center nose rest enables the shooter to use it with a slight horizontal turning of the head which is a natural movement into the rifle stock. Present normal bifocals require a head tilting and turning which leads to inconsistent marksmanship and impeded distance viewing.

1 Claim, 4 Drawing Sheets

FIG.1

SINGLE BIFOCAL CUSTOM SHOOTERS GLASSES

CROSS-REFERENCE TO RELATED APPLICATIONS

This application is entitled to the benefit of Provisional Patent Application Ser. No. 60/277034, Filed Mar. 19, 2001.

BACKGROUND—FIELD OF INVENTION

This invention relates to eye glass optics, specifically to an improved single bifocal design for the shooter, hunter and fisherman.

BACKGROUND—DESCRIPTION OF PRIOR ART

Outdoorsmen that require the use of prescription eye glasses for near of far sighted correction encounter a few inconveniences while hunting or target shooting or even fishing. They need to see a clear image and cross hairs in the scope in order to achieve the best results. For some, this means putting on their glasses, while others must take them off. In either case, their distance viewing is compromised. This inconvenience of taking off and putting on the glasses is very annoying and can be resolved with a new practical design. Fishermen will also find this design desirable since they must see tiny lures and leader materials using reading glasses or bifocals yet they also must walk on uneven rocky stream bottoms and river edges where it is very difficult to use normal bifocals, so they take them off to avoid tripping.

Although there has been no prior art specifically for shooters or fishermen like this, There have been patents issued for golfers and mechanics glasses which were designed to solve their respective problems. The problem solved by this invention is utility and ease of use when shooting a scoped weapon while target shooting or hunting. With the bifocal reading segment carefully located in the tense used for sighting into the scope and placed near to the nose bridge and nose rest area, these glasses only require a simple natural rotation of the head in assuming good shooting posture to view the target and cross hairs in the scope. If the target is momentarily lost while hunting, it is easy to pick it up again since the other tense is without a bifocal and distance viewing is unimpeded and easily accomplished. With typical bifocals, the head must be tilted back and turned carefully to view the scope. Both eyes end up looking through the bifocal lenses thus distance viewing is impeded, plus alignment is very difficult to repeat and this leads to inconsistent results. It is also difficult to walk on uneven terrain with bifocals since the bottom bifocal lense design causes the near ground to be even more near. Consequently, they must be taken off to proceed.

With the new design of the single bifocal the glasses can be left on for walking over the uneven terrain as desired. They are therefore much safer.

SUMMARY

In accordance with the present invention a pair of Single Bifocal Custom Shooters Glasses comprises a pair of prescription glasses with one semicircular bifocal reading segment located near the center nose rest and nose bridge in the aiming eye lense and the other lense is single vision distance corrected only without the bifocal.

OBJECTS AND ADVANTAGES

Accordingly, several objects and advantages of my Single Bifocal Custom Shooters Glasses are:

(a) To provide an easy to use bifocal with a conveniently placed bifocal segment for the outdoorsman shooting a scoped weapon.

(b) To provide eye glasses that can be left on while hunting, fishing or target shooting instead of putting reading glasses on and off for sighting in the rifle scope or tying on a new fishing fly.

(c) To provide eye glasses that can be left on while walking on uneven terrain without tripping as with normal common bifocals, thus they are safer.

(d) To provide eye glasses that would lead to a more repeatable shooting setup with a slight turn of the head much easier to do than tilting the head into position.

(e) To provide improved marksmanship for more precise, accurate shots.

DRAWING FIGURES

DESCRIPTION OF THE PREFERRED EMBODIMENTS

Figure 1:
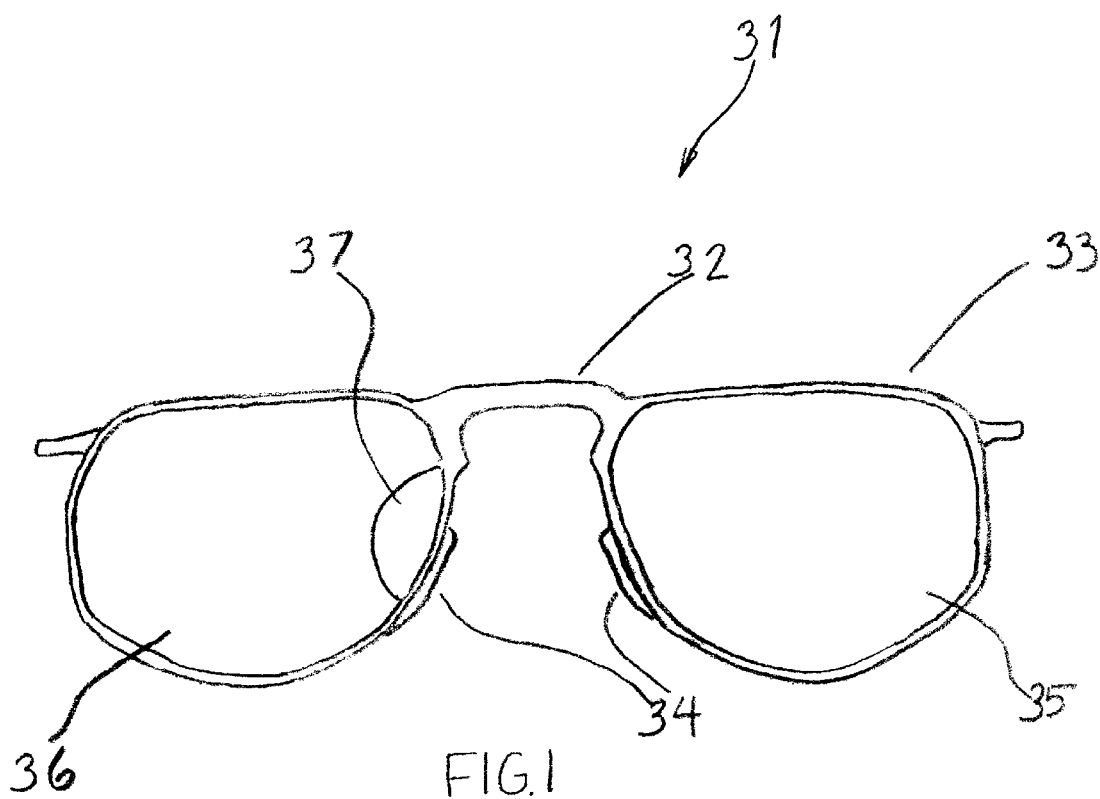
FIG. 1 is a perspective of the right handed shooters Single Bifocal Custom Shooters Glasses constructed in accordance with the invention shown front view.
Figure 2:
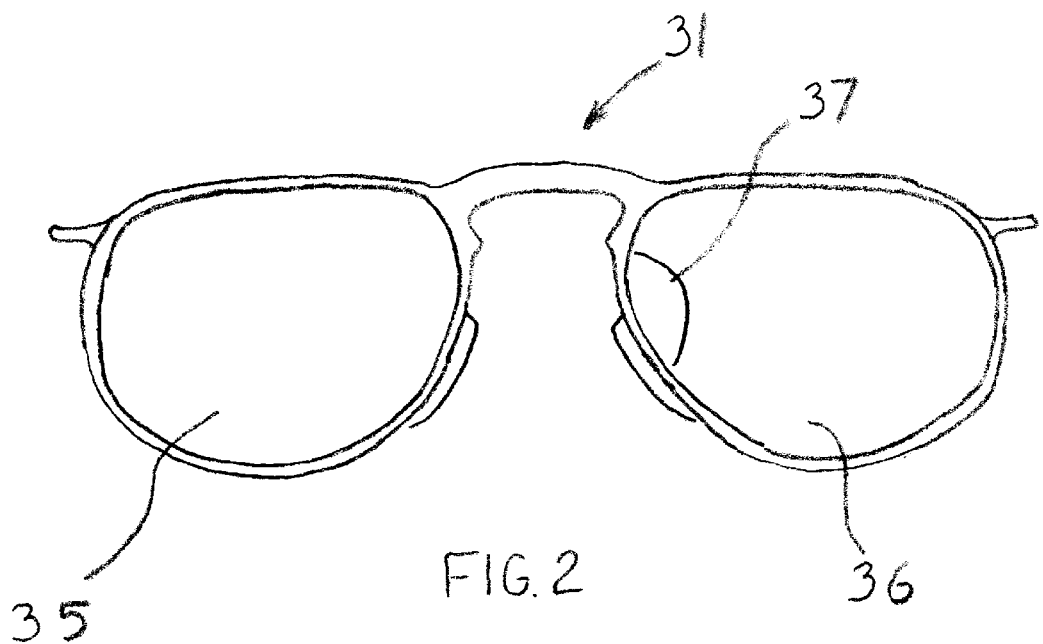
FIG. 2 is a perspective of the left handed version of FIG. 1.
Figure 3:
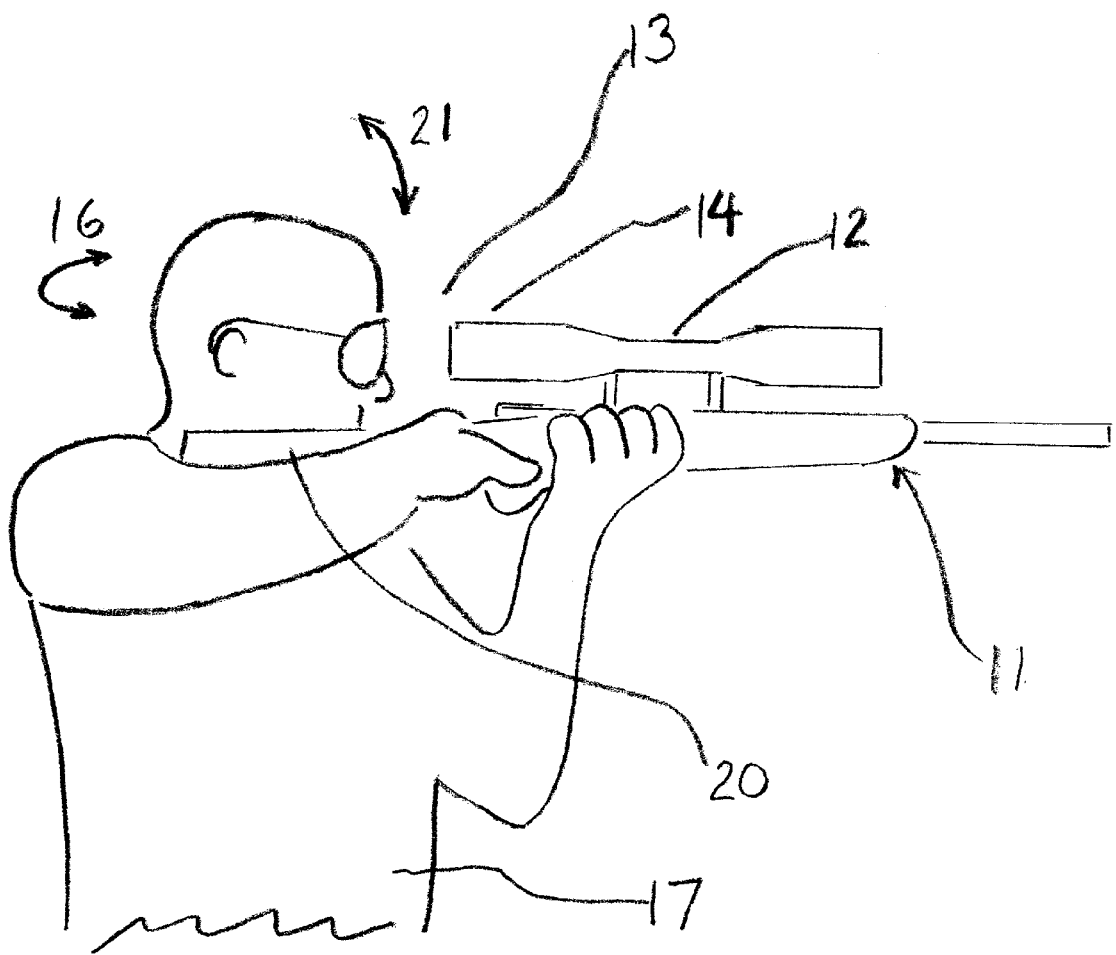
FIG. 3 is a right side view of the shooter shown in FIG. 4.
Figure 4:
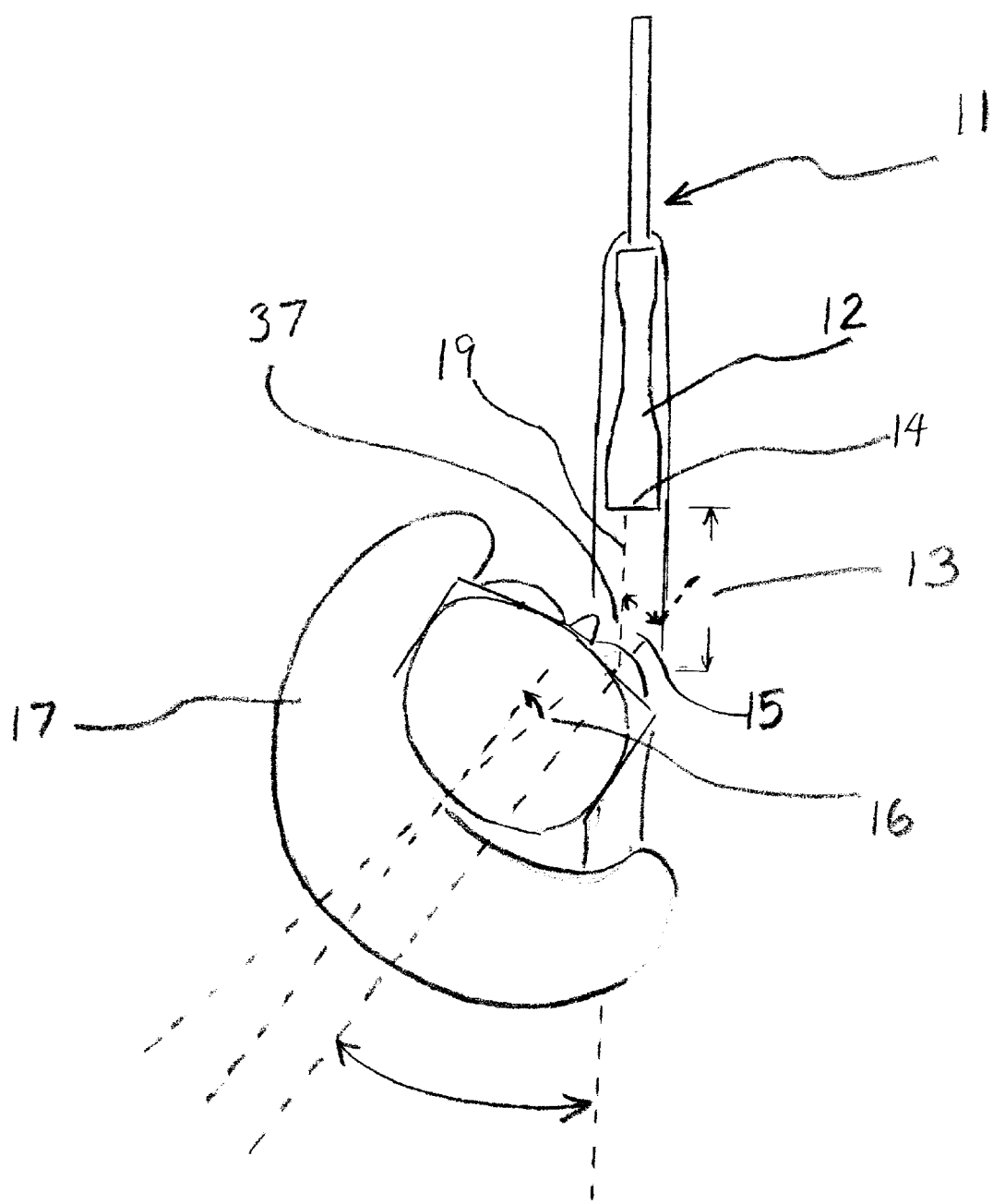
FIG. 4 is an overhead top view of a right handed shooter using a scoped rifle and wearing the Single Bifocal Custom Shooters Glasses.
Figure 5:
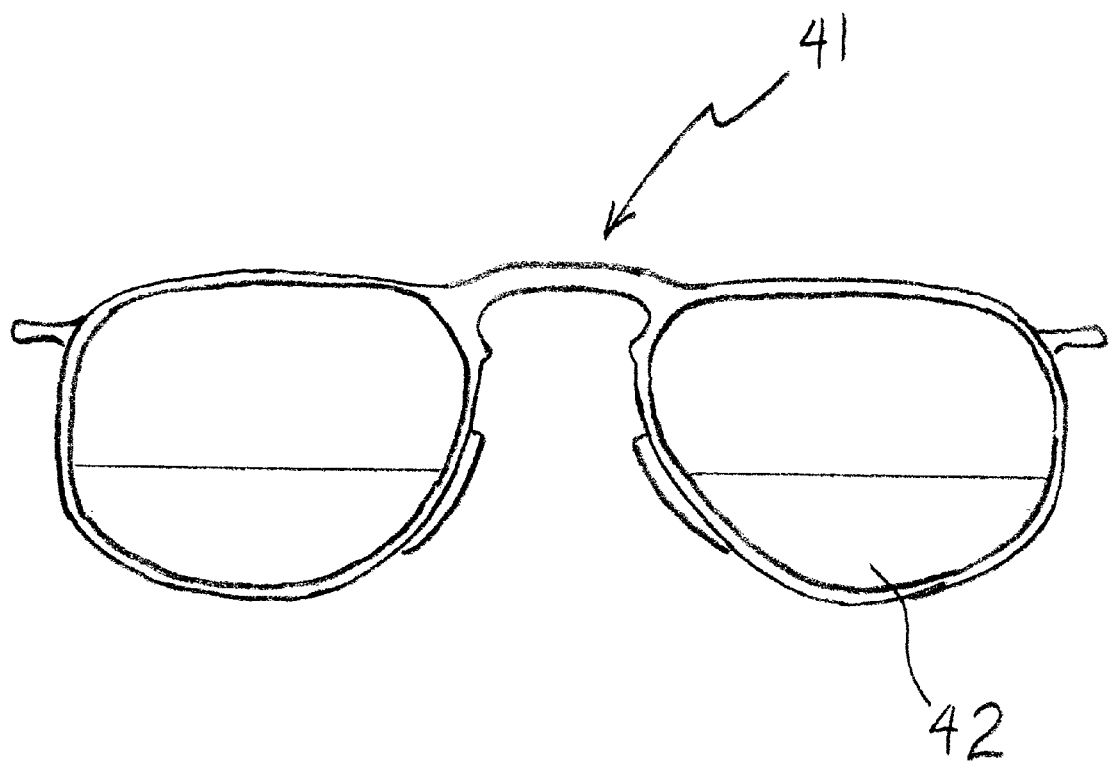
FIG. 5 is a perspective of common bifocal glasses with the bottom split bifocal segment used for reading or close viewing.

The present invention includes a pair of glasses (31) to be worn by a shooter (17) using a scoped rifle (11) or pistol where correction is needed by the shooter in order to obtain a clear site picture in the viewing end (14) of the scope (12). The right lens (36) for a right handed shooter would contain a custom configured bifocal element (37) for his/her convenience. The left eye lens (35) would not contain this bifocal area but would be clear or prescription for distance as required the shooter (17). The far sighted person would want a bifocal similar to their glass correction in order for the image on the scope to be clear and focused since the scope is viewed from a distance called eye relief (13), the distance between the shooters eye and the back of the scope. Properly placed and sized, this bifocal area (37) does not impede the distance viewing of the glass and thus, the hunter or shooter does no have to put on and take off his glasses constantly while in the field. The left handed shooter would need the shooters bifocal in the left eye and not in the right side as in FIG. 2. The placement of the bifocal adjacent the center nose rest (34) enables the shooter to use it with a slight horizontal turning of the head (16) which is a natural movement into the rifle stock (20) which causes the shooter to view into the viewing lens (14) at the viewing angle (15). Present normal bifocals (41) required a head tilting (21) and turning (16) which leads to inconsistent marksmanship and impeded distance viewing. This invention provides a highly improved, easy to use, safer, device that can be used by hunters, shooters and outdoorsmen that rely on glasses for clear close vision. It leads to better marksmanship and improved hunting success. It is safer to use than normal bifocals (41) since these glasses can be left on without fear of tripping because the bifocal doesn't distort the terrain beneath your feet, and the location of the single small semicircular bifocal adjacent to the nose bridge allows for unimpeded distance viewing.

REFERENCE NUMERALS IN DRAWINGS 11 rifle
12 scope
13 eye relief distance
14 viewing lense
15 viewing angle
16 head turn
17 shooter
19 line of sight
20 cheek rest
21 head tilt
31 single bifocal eye glasses
32 nose bridge
33 frames
34 nose rests
35 prescription lense w/o bifocal
36 prescription lense with bifocal
37 bifocal segment
41 common bifocal glasses
42 common bifocal lense

CONCLUSION, RAMIFICATIONS, AND SCOPE

Thus, the reader will see that the Single Bifocal Custom Shooters Glasses of the invention provides a highly improved, easy to use, convenient, safer, more reliable device that can be used by many outdoorsmen, hunters, and fishermen that rely on glasses for clear close vision. It leads to better marksmanship and improved hunting success, and more constant protection for the eyes as they can be left on without being awkward or cumbersome. It greatly improves repeatability and reliability.

While my above description contains many specifics, these should not be construed as limitations on the scope of the invention, but rather as an exemplification of one preferred embodiment thereof. Other variations are possible. For example, the bifocal segment can have other shapes such as a straight edge and semicircular; the bifocal might be slightly larger or smaller; the lenses can be tinted for light enhancement; the lenses can be polarized for improved vision into water for fishermen; the user might be an archer using these glasses to improve his sighting of his bow equipped with sight pins, reticles or a scope; the lenses can be snap in compatible with existing shooters glasses designed for snap ins; the frames might have different styles; the lenses might be different light weight impact or scratch resistant material such as polycarbonate.

What is claimed is:

1. A pair of eye glasses for scoped weapon shooting comprising:

(a) a pair of prescription lenses corrected for distance viewing and (b) one of those lenses comprising a prescription bifocal with a semi circular reading segment located immediately adjacent the center nose rest, whereby the shooter can view the sight picture in the scope with a sight natural rotation of the head as good shooting posture and alignment along the target line is assumed, distance viewing is readily achieved through the lenses in the event that there is a loss of target while hunting, and the glasses can be left on without the fear of tripping, since the semicircular reading segment is located immediately adjacent the center nose rest.

* * * * *